United States Patent
Chatbri et al.

(10) Patent No.: US 12,175,799 B2
(45) Date of Patent: Dec. 24, 2024

(54) METHODS AND SYSTEMS FOR ADAPTIVE, TEMPLATE-INDEPENDENT HANDWRITING EXTRACTION FROM IMAGES USING MACHINE LEARNING MODELS

(71) Applicant: THE BANK OF NEW YORK MELLON, New York, NY (US)

(72) Inventors: Houssem Chatbri, New York, NY (US); Bethany Kok, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 484 days.

(21) Appl. No.: 17/371,951

(22) Filed: Jul. 9, 2021

(65) Prior Publication Data

US 2023/0008766 A1 Jan. 12, 2023

(51) Int. Cl.
*G06V 40/30* (2022.01)
*G06N 3/08* (2023.01)
(Continued)

(52) U.S. Cl.
CPC ............ *G06V 40/382* (2022.01); *G06N 3/08* (2013.01); *G06T 5/50* (2013.01); *G06T 5/70* (2024.01);
(Continued)

(58) Field of Classification Search
CPC .... G06V 40/382; G06V 40/394; G06V 10/82; G06V 30/226; G06V 30/00; G06V 30/10;
(Continued)

(56) References Cited

U.S. PATENT DOCUMENTS

| | | | | |
|---|---|---|---|---|
| 7,469,063 B2 * | 12/2008 | Koyama | ............ | G06V 30/2455 |
| | | | | 382/187 |
| 8,194,277 B2 * | 6/2012 | Maeda | ................... | G06T 11/60 |
| | | | | 358/448 |

(Continued)

OTHER PUBLICATIONS

Roland Graef et al., "A Novel Hybrid Optical Character Recognition Approach for Digitizing Text in Forms", Advances in Databases and Information Systems (Lecture Notes in Computer Science), retrieved Apr. 27, 2019, pp. 206-220. (Year: 2019).*

(Continued)

*Primary Examiner* — Manav Seth
(74) *Attorney, Agent, or Firm* — Pillsbury Winthrop Shaw Pittman, LLP

(57) ABSTRACT

Methods and systems for adaptive, template-independent handwriting extraction from images using machine learning models and without manual localization or review. For example, the system may receive an input image, wherein the input image comprises native printed content and handwritten content. The system may process the input image with a model to generate an output image, wherein the output image comprises extracted handwritten content based on the native handwritten content. The system may process the output image to digitally recognize the extracted handwritten content. The system may generate a digital representation of the input image, wherein the digital representation comprises the native printed content and the digitally recognized extracted handwritten content.

20 Claims, 9 Drawing Sheets

(51) Int. Cl.
  *G06T 5/50* (2006.01)
  *G06T 5/70* (2024.01)

(52) U.S. Cl.
  CPC .. *G06V 40/394* (2022.01); *G06T 2207/20024* (2013.01); *G06T 2207/20221* (2013.01)

(58) Field of Classification Search
  CPC .... G06V 30/18; G06V 30/22; G06V 30/2264; G06N 3/08; G06N 3/045; G06N 20/00; G06N 3/044; G06N 3/04; G06N 20/20; G06N 3/048; G06N 5/01; G06N 7/01; G06N 20/10; G06N 3/082; G06N 5/04; G06T 5/002; G06T 5/50; G06T 2207/20024; G06T 2207/20221; G06T 7/10; G06T 7/11; G06T 2207/20021; G06T 2207/20112; G06T 2207/20132; G06T 5/70; G06F 16/35; G06F 16/353; G06F 16/355
  See application file for complete search history.

(56) References Cited

U.S. PATENT DOCUMENTS

| | | | | |
|---|---|---|---|---|
| 9,646,230 | B1* | 5/2017 | Prulhiere | G06V 30/224 |
| 10,671,892 | B1* | 6/2020 | Daskalov | G06F 18/217 |
| 10,846,553 | B2* | 11/2020 | Hoehne | G06V 30/40 |
| 2006/0062459 | A1* | 3/2006 | Saito | G06V 30/413 |
| | | | | 382/181 |
| 2018/0137349 | A1* | 5/2018 | Such | G06V 30/414 |
| 2020/0302208 | A1* | 9/2020 | Hoehne | G06N 3/08 |
| 2024/0281944 | A1* | 8/2024 | Jayaraman | G06V 10/82 |

OTHER PUBLICATIONS

R. M. Patel and A. J. Goswami, "Abstractive Text Summarization with LSTM using Beam Search Inference Phase Decoder and Attention Mechanism," 2021 International Conference on Communication, Control and Information Sciences (ICCISc), Idukki, India, 2021, pp. 1-6, doi: 10.1109/ICCISc52257.2021.9484880. (Year: 2021).*

R. Manmatha et al., "A Scale Space Approach for Automatically Segmenting Words from Historical Handwritten Documents", IEEE Transactions of Pattern Analysis and Machine Intelligence, vol. 27, No. 8, Aug. 2005, pp. 1212-1225. (Year: 2005).*

Extended European Search Report dated Nov. 16, 2022, issued in corresponding European Patent Application No. 22183594.5 (13 pgs.).

Roland Graef et al., "A Novel Hybrid Optical Character Recognition Approach for Digitizing Text in Forms", Advances in Databases and Information Systems (Lecture Notes in Computer Science), retrieved Apr. 27, 2019, pp. 206-220.

R. Manmatha et al., "A Scale Space Approach for Automatically Segmenting Words from Historical Handwritten Documents", IEEE Transactions of Pattern Analysis and Machine Intelligence, vol. 27, No. 8, Aug. 2005, pp. 1212-1225.

* cited by examiner

500

Original image

Small filtering

High filtering

Significant filtering

METHODS AND SYSTEMS FOR ADAPTIVE, TEMPLATE-INDEPENDENT HANDWRITING EXTRACTION FROM IMAGES USING MACHINE LEARNING MODELS

BACKGROUND

Each year the number of documents transferred and/or processed electronically, as opposed to transferring and/or processing manually, increases exponentially. Nonetheless, in many instances, correctly transferring and/or processing still requires some amount of manual processing. For example, in many instances, transferred and/or processed electronic documents may have handwritten and/or manually generated content that cannot be transferred and/or processed without manual intervention. A specific example of this, is when a document includes a signature and/or manual edits to printed content. Due to this, the transferring and processing of these documents is both slower and subjects the documents to an increased risk due to the potential for errors.

SUMMARY

In view of the foregoing, methods and systems are disclosed for transferring and/or processing a mixture of printed and handwritten content that does not reduce the speed of the transferring and/or processing and does not create an increased risk. Furthermore, the methods and systems overcome the shortfalls of conventional solutions to this approach. For example, transferring and/or processing documents featuring a mixture of printed and handwritten content requires overcoming several technical hurdles. That is, to digitize a scanned document the system needs to locate the text and then translate the text. For printed text, optical character recognition ("OCR") systems may perform both steps. However, handwritten text, conventional systems are not able to locate content.

In view of this, conventional solutions rely either on the use of manual edits/entry (e.g., manual mark-ups and/or bounding boxes) or processing pathways that avoid or abandon handwritten content altogether (e.g., the use of electronic portals). That is, conventional solutions cannot solve for unstructured or semi-structured document cases and must rely on the document's layout. For example, one conventional solution to the aforementioned problem is the use of manual edits/entry. In such cases, handwritten content may be identified manually and converted to an electronic form via manual data entry. To ease this burden, the system may provide a specific format of documents (e.g., documents with spaces reserved explicitly for handwritten content to enable easier identification of the handwritten content) or may have manual edits to document the "box" (e.g., draw manually draw electronic boxes around handwritten content), both approaches have significant disadvantages. First, the use of only documents with specific formats is very limiting and is not practical. Moreover, it relies on documents being scanned in the correct size and/or orientation, which may not happen. Second, providing manual edits to the document (e.g., box drawing) is time consuming and still introduces a human element that may increase risk. The other conventional solution is to entirely abandon the transferring and/or processing of documents with a mixture of handwritten and printed content. These systems do this through the use of electronic portals for receiving documents and the requirement of electronic signatures upon the receipt of the document. These solutions are problematic, as electronic portals put an additional burden on users submitting the documents to the system and electronic signatures may not be appropriate (or possible) in all situations.

In contrast to these conventional solutions, the methods and systems provide a novel solution to locating handwritten content in documents featuring a mixture of printed and handwritten content. The solution disclosed herein does not rely on a document's layout and is able to solve for unstructured or semi-structured document cases. That is, the methods and systems may receive documents featuring a mixture of printed and handwritten content, locate both handwritten and/or printed text and translate the text into machine-readable text (e.g., handwriting extraction that is document-adaptive and template-independent). Thus, not only do the methods and systems provide a novel solution to the technical problem of text localization of handwritten content, but the methods and systems significantly reduce our manual data entry requirements while also maintaining a smooth user experience when submitting documents.

In particular, the methods and systems provide handwriting extraction that is document-adaptive and template-independent through the use of a machine learning model. The machine learning model achieves the aforementioned benefits through the use of handwriting extraction and scale space character merging. More specifically, the system may receive an inputted image (e.g., a raw image containing a mixture of handwritten and printed content). The system then detects handwritten characters using a supervised image pattern recognition model. The system then joins the handwritten characters into handwritten words using an adaptive blurring and merging approach. The detected handwritten words may then be translated into machine-readable content. Optionally, the system may perform one or more preprocessing steps (e.g., filtering printed content). The system may then process an output image to digitally recognize the extracted handwritten content, which may involve generating a digital representation of the input image, wherein the digital representation comprises the native printed content and the digitally recognized extracted handwritten content.

In one aspect, methods and systems are described for adaptive, template-independent handwriting extraction from images using machine learning models and without manual localization or review. For example, the system may receive an input image, wherein the input image comprises native printed content and handwritten content. The system may process the input image with a model to generate an output image, wherein the output image comprises extracted handwritten content based on the native handwritten content, and wherein the model: filters out printed content in inputted images; extracts units of handwritten content in the inputted images; and adaptively merges the units of handwritten content in the inputted images. The system may process the output image to digitally recognize the extracted handwritten content. The system may generate a digital representation of the input image, wherein the digital representation comprises the native printed content and the digitally recognized extracted handwritten content.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion) a given item (e.g., data) unless the context clearly dictates otherwise.

DETAILED DESCRIPTION OF THE DRAWINGS

Figure 1:
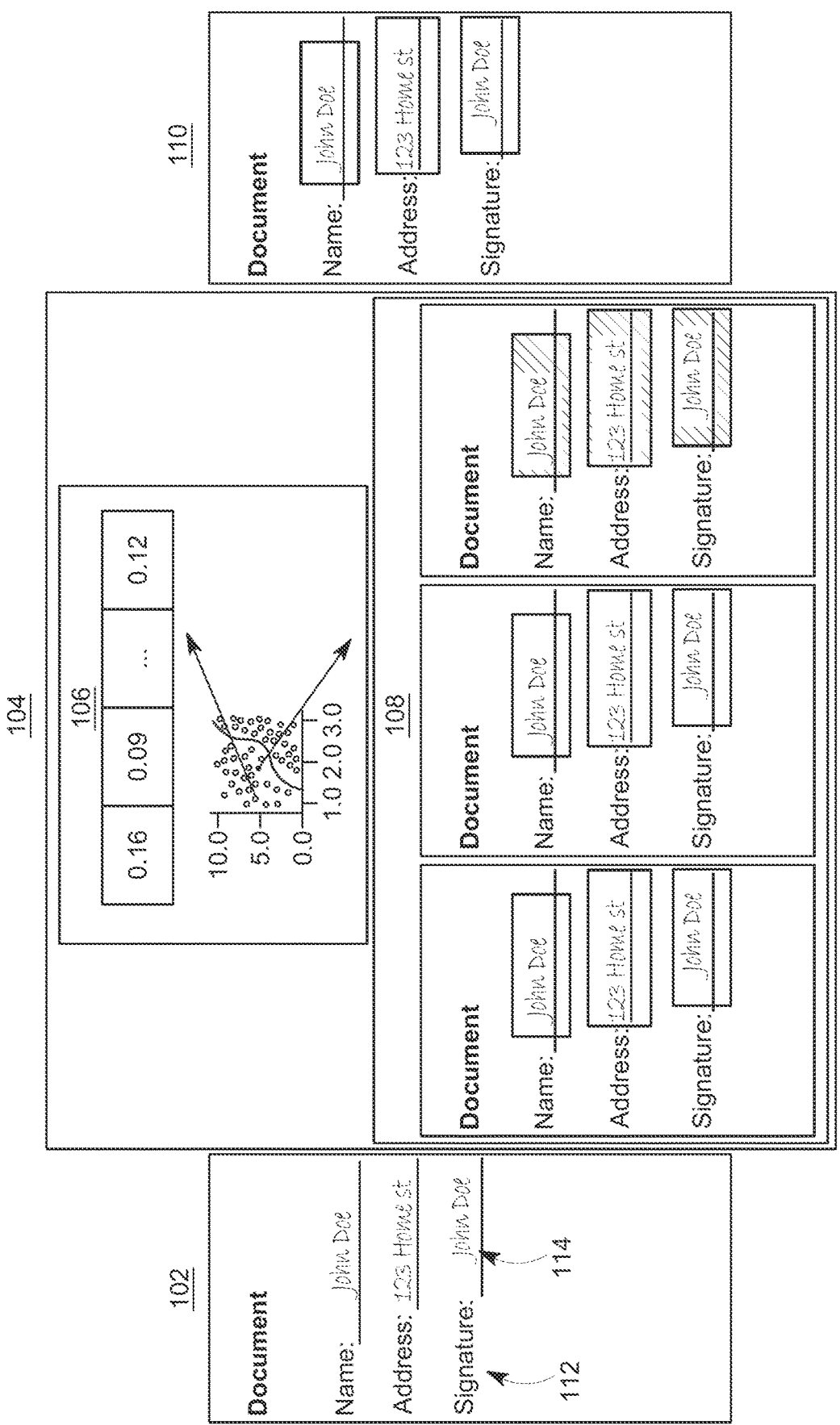
FIG. 1 shows an illustrative architecture for adaptive, template-independent handwriting extraction from images, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in a block diagram form in order to avoid unnecessarily obscuring the embodiments of the invention.

As described herein, the methods and systems provide a novel solution to locating handwritten text in content featuring a mixture of printed and handwritten content. As referred to herein, "content" may include, and the embodiments described herein are applicable to any electronically consumable content, such as television programming, Internet content (e.g., streaming content, downloadable content, webcasts, etc.), video clips, audio, text and/or textual data, metadata, pictures, images, scanned documents, playlists, websites, articles, books, electronic books, blogs, advertisements, chat sessions, social media, applications, games, and/or any other media or multimedia and/or combination of the same. As described herein, users may access this content via a user interface. As referred to herein, a "user interface" may comprise a human-computer interaction and communication in a device, and may include display screens, keyboards, a mouse, and the appearance of a desktop. For example, a user interface may comprise a way a user interacts with an application or a website, the mechanism in which the user interacts, and/or a portion of a screen within which the user interacts.

As referred to herein, "handwritten" may include content that originated from, was added by, and/or otherwise included in content by a pen, pencil, stylus, finger, and/or other handheld implement. Handwritten content may additionally, or alternatively, include any content that does not conform to a standardized print and/or text style database. Handwritten content may be contrasted with, or distinguished from, printed content. As referred to herein, "printed" may include content that was not originated from, was added by, and/or otherwise included in content by a pen, pencil, stylus, finger, and/or another handheld implement. Printed content may additionally or alternatively include any content that conforms to a standardized print and/or text style database. It should also be noted that in some embodiments, handwritten content may include computer generated content in which textual characters are generated in a style in which the textual characters touch and/or mimic content written using a handheld implement and/or computer generated content that is appended to other content as an image (e.g., an image of a signature added to a document).

The methods and systems may provide the novel solution to locating handwritten content in other content that features a mixture of printed and handwritten content using artificial intelligence and/or a system that implements artificial intelligence. For example, the system may use one or more artificial intelligence models (including machine learning models, neural networks, etc.) referred to herein collectively as "models." The solution disclosed herein does not rely on a document's layout and is able to solve for unstructured or semi-structured document cases. That is, the methods and systems may receive documents featuring a mixture of printed and handwritten content, locate both handwritten and/or printed text and translate the text into machine-readable text (e.g., handwriting extraction that is document-adaptive and template-independent). Thus, not only do the methods and systems provide a novel solution to the technical problem of text localization of handwritten content, but the methods and systems significantly reduce our manual data entry requirements, while also maintaining a smooth user experience when submitting documents.

In particular, the methods and systems provide handwriting extraction that is document-adaptive and template-independent through the use of a machine learning model. The machine learning model achieves the aforementioned benefits through the use of handwriting extraction and scale space character merging. More specifically, the system may receive an inputted image (e.g., a raw image containing a mixture of handwritten and printed content). The system then detects handwritten characters using a supervised image pattern recognition model. The system then detects handwritten words using an adaptive blurring and merging approach. The detected handwritten words may then be translated into machine-readable content. Optionally, the system may perform one or more preprocessing steps (e.g., filtering printed content). The system may then process an output image to digitally recognize the extracted handwritten content, which may involve generating a digital representation of the input image, wherein the digital representation comprises the native printed content and the digitally recognized extracted handwritten content.

FIG. 1 shows an illustrative architecture for adaptive, template-independent handwriting extraction from images, in accordance with one or more embodiments. For example, image 102 may comprise an image of a document. Image 102 may include both handwritten content (e.g., content 114) and printed content (e.g., content 112). The system may receive image 102 and input image 102 into model 104.

Model 104 may include one or more components for detecting handwritten content (e.g., content 114) in image 102. For example, model 104 may include model 106. Model 106 may be a supervised image pattern recognition model that detects handwritten content. For example, model 106 may automatically recognize patterns and regularities in image 102. Model 106 may be trained from labeled training data, but when no labeled data is available, other algorithms can be used to discover previously unknown patterns. For example, model 106 may provide an assignment of a label (e.g., handwritten or printed) based on a series of values based on pixel data corresponding to a portion of image 102.

In some embodiments, model 106 may use statistical inference to determine the best label for a given instance (e.g., portion of image 102). For example, model 106 may comprise a classifier algorithm that provides an assignment of a label (e.g., handwritten or printed). Alternatively or additionally, model 106 may be a probabilistic classifier that provides an output probability of the instance being described by the given label. For example, model 106 may determine that content 114 is handwritten content and content 112 is printed content.

Based on a label applied by model 106 (e.g., handwritten or printed), model 104 may identify content as handwritten or printed. Handwritten content may then be processed by model 108. Model 108 may merge detected content using an adaptive blurring and merging approach. For example, model 108 may process the content labeled as handwritten to determine an optimal level of blurring and merging. Through blurring and merging, model 108 may identify text strings (e.g., words) and groups of test strings (e.g., groups of words) in image 102. For example, model 108 may apply blurring and merging to content 114 to determine that one or more portions of content 114 corresponds to a single text character (e.g., letter), text string (e.g., word), and/or group of text strings (e.g., sentence). Model 104 may then output image 110, which may comprise a digital representation of the input image, wherein the digital representation comprises an indication of detected handwritten content.

Figure 2:
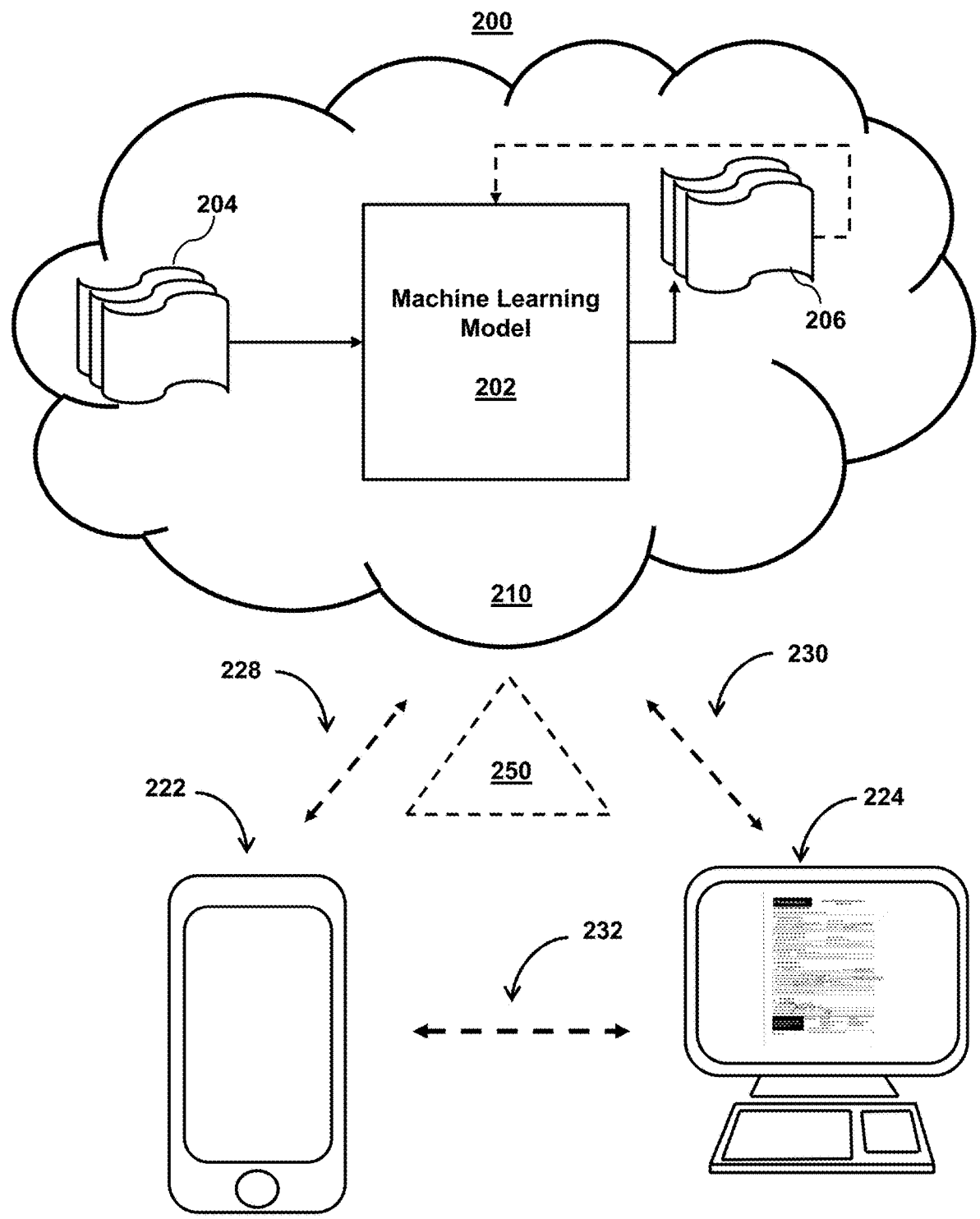
FIG. 2 shows an illustrative system for adaptive, template-independent handwriting extraction from images using machine learning models, in accordance with one or more embodiments.

FIG. 2 shows an illustrative system for adaptive, template-independent handwriting extraction from images using machine learning models, in accordance with one or more embodiments. For example, system may represent the components used for extracting and/or digitizing handwritten content. As shown in FIG. 2, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system and may feature one or more component devices. It should also be noted that system 200 is not limited to three devices. Users, may, for instance, utilize one or more devices to interact with one another, one or more servers, or other components of system 200. It should be noted, that, while one or more operations are described herein as being performed by particular components of system 200, those operations may, in some embodiments, be performed by other components of system 200. As an example, while one or more operations are described herein as being performed by components of mobile device 222, those operations, may, in some embodiments, be performed by components of cloud components 210. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data (e.g., conversational response, queries, and/or notifications).

Additionally, as mobile device 222 and user terminal 224 are shown as touchscreen smartphones, these displays also act as user input interfaces. It should be noted that in some embodiments, the devices may have neither user input interface, nor displays, and may instead receive and display content using another device (e.g., a dedicated display device such as a computer screen and/or a dedicated input device such as a remote control, mouse, voice input, etc.). Additionally, the devices in system 200 may run an application (or another suitable program). The application may cause the processors and/or control circuitry to perform operations related to generating dynamic conversational replies, queries, and/or notifications.

Each of these devices may also include electronic storage. The electronic storage may include non-transitory storage media that electronically stores information. The electronic storage media may include one or both of the following: (i) system storage that is provided integrally (e.g., substantially non-removable) with servers or client devices, or (ii) removable storage that is removably connectable to the servers or client devices via; for example, a port (e.g., a USB port, a firewire port, etc.) or a drive (e.g., a disk drive, etc.). The electronic storage may include one or more of the following: optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 5G or LTE network), a cable network, a public switched telephone network, or other types of communications networks or combinations of communications networks. Communication paths 228, 230, and 232 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 210 may also include control circuitry configured to perform the various operations needed for adaptive, template-independent handwriting extraction.

Cloud components 210 may include model 202, which may be a machine learning model (e.g., as described in FIG. 2). Model 202 may take inputs 204 and provide outputs 206. The inputs may include multiple datasets such as a training dataset and a test dataset. Each of the plurality of datasets (e.g., inputs 204) may include data subsets related to user data, predicted intents, and/or actual intents. In some embodiments, outputs 206 may be fed back to model 202 as input to train model 202 (e.g., alone or in conjunction with user indications of the accuracy of outputs 206, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In another embodiment, model 202 may update its configurations (e.g., weights, biases, or other parameters) based on the assessment of its prediction (e.g., outputs 206) and reference feedback information (e.g., user indication of accuracy, reference labels, or other information). In another embodiment, where model 202 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 202 may be trained to generate better predictions.

In some embodiments, model 202 may include an artificial neural network. In such embodiments, model 202 may include an input layer and one or more hidden layers. Each neural unit of model 202 may be connected with many other neural units of model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 202 may be self-learning and trained, rather than explicitly programmed, and can perform significantly better in certain areas of problem solving, as compared to traditional computer programs. During training, an output layer of model 202 may correspond to a classification of model 202 and an input known to correspond to that classification may be input into an input layer of model 202 during training. During testing, an input without a known classification may be input into the input layer, and a determined classification may be output.

In some embodiments, model 202 may include multiple layers (e.g., where a signal path traverses from front layers to back layers). In some embodiments, back propagation techniques may be utilized by model 202 where forward stimulation is used to reset weights on the "front" neural units. In some embodiments, stimulation and inhibition for model 202 may be more free-flowing, with connections interacting in a more chaotic and complex fashion. During testing, an output layer of model 202 may indicate whether or not a given input corresponds to a classification of model 202 (e.g., a user intent).

In some embodiments, model 202 may predict handwritten versus printed content. For example, the system may determine that particular characteristics are more likely to be indicative of a prediction. In some embodiments, the model (e.g., model 202) may automatically perform actions based on outputs 206. In some embodiments, the model (e.g., model 202) may not perform any actions on a user's account. The output of the model (e.g., model 202) is only used to decide whether content is handwritten or printed.

System 200 also includes API layer 250. In some embodiments, API layer 250 may be implemented on mobile device 222 or user terminal 224. Alternatively or additionally, API layer 250 may reside on one or more of cloud components 210. API layer 250 (which may be A REST or Web services API layer) may provide a decoupled interface to data and/or functionality of one or more applications. API layer 250 may provide a common, language-agnostic way of interacting with an application. Web service APIs offer a well-defined contract, called WSDL, that describe the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 250 may use various architectural arrangements. For example, system 200 may be partially based on API layer 250, such that there is strong adoption of SOAP and RESTful Web-services, using resources like Service Repository and Developer Portal but with low governance, standardization, and separation of concerns. Alternatively, system 200 may be fully based on API layer 250, such that separation of concerns between layers like API layer 250, services, and applications are in place.

In some embodiments, the system architecture may use a microservice approach. Such systems may use two types of layers: Front-End Layer and Back-End Layer where microservices reside, in this kind of architecture, the role of the API layer 250 may provide integration between Front-End and Back-End. In such cases, API layer 250 may use RESTful APIs (exposition to front-end or even communication between microservices). API layer 250 may use AMQP (e.g., Kafka, RabbitMQ, etc.). API layer 250 may use incipient usage of new communications protocols such as gRPC, Thrift, etc.

In some embodiments, the system architecture may use an open API approach. In such cases, API layer 250 may use commercial or open source API Platforms and their modules. API layer 250 may use developer portal. API layer 250 may use strong security constraints applying WAF and DDoS protection, and API layer 250 may use RESTful APIs as standard for external integration.

Figure 3:
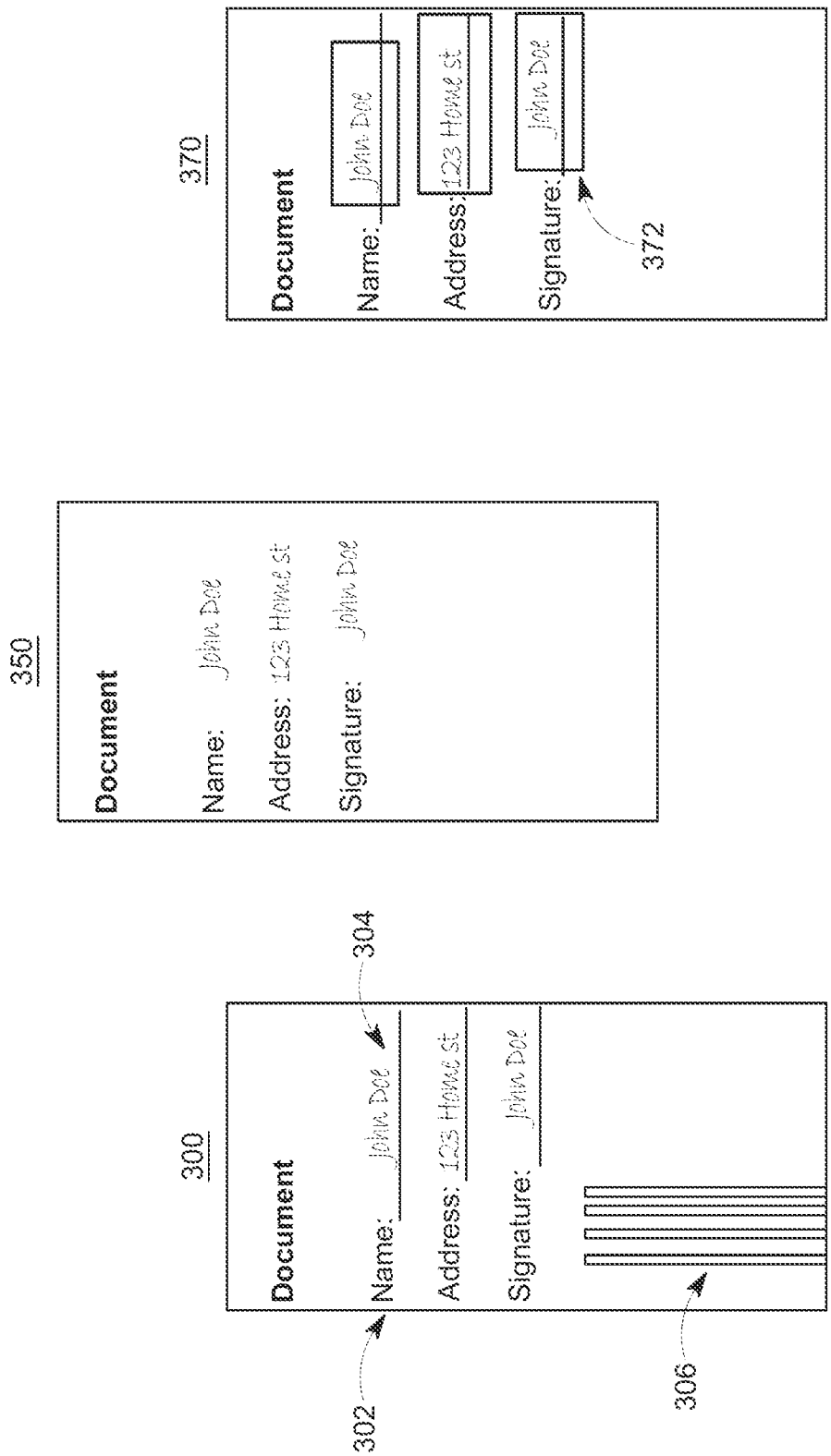
FIG. 3 shows an illustrative diagram for handwriting extraction, in accordance with one or more embodiments.

FIG. 3 shows an illustrative diagram for handwriting extraction, in accordance with one or more embodiments. For example, FIG. 3 may represent the system distinguishing between handwritten and printed content. For example, image 300 may comprise an image of a document. Image 300 may include both handwritten content (e.g., content 304) and printed content (e.g., content 302). The system may receive image 300. The system may include one or more components for detecting handwritten content (e.g., content 304) in image 300. For example, the system may include a supervised image pattern recognition model that detects handwritten content. The system may then determine what content is handwritten content (e.g., content 304) and/or what content is printed content (e.g., content 302).

The system may process the content labeled as handwritten (e.g., content 304) to determine an optimal level of blurring and merging as shown in image 350. Through blurring and merging, the system may identify text strings (e.g., words) and groups of test strings (e.g., groups of words) in image 350. For example, the system may apply blurring and merging to content 114 to determine that one or more portions of content 114 correspond to a single text character (e.g., letter), text string (e.g., word), and/or group of text strings (e.g., sentence). The system may then output image 370, which may comprise a digital representation of the input image, wherein the digital representation comprises an indication (e.g., indication 372) of detected handwritten content.

For example, the system may determine units of content that should be extracted. For example, a unit may have a contiguous region of foreground pixels that are connected (e.g. character strokes).

FIG. 3 may also show one or more optional preprocessing steps. For example, in some embodiments, the system may remove horizontal and/or vertical lines using a convolutional image filter that detects horizontal and vertical patters. Additionally or alternatively, the system may filter out unnecessary patterns in the input image (e.g., logos, background content, and/or other graphical elements). For example, the system may filter out graphic 306. By removing these elements, the system improves its ability to extract handwritten content.

Figure 4:
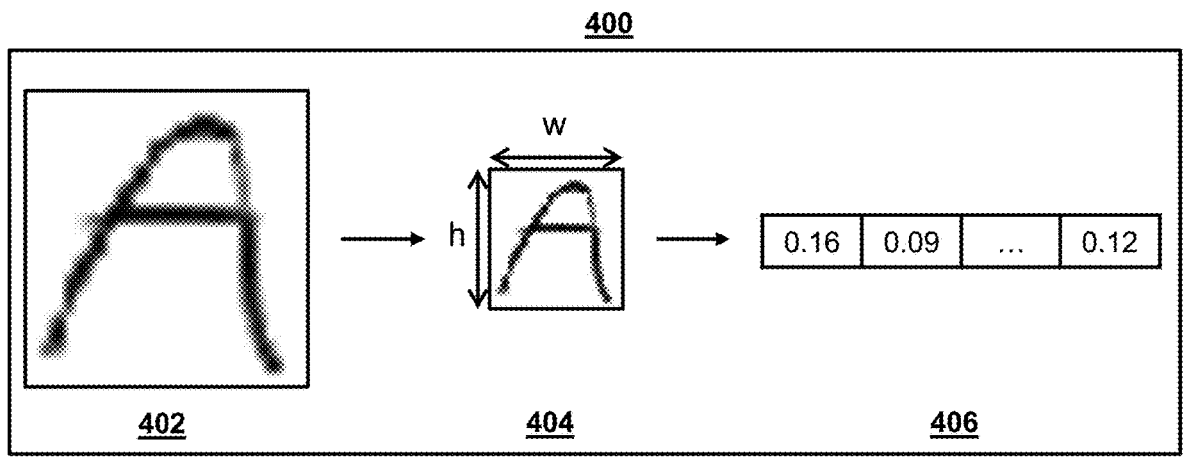
FIG. 4 shows an illustrative diagram for distinguishing between handwritten and printed content, in accordance with one or more embodiments.
Figure 4:
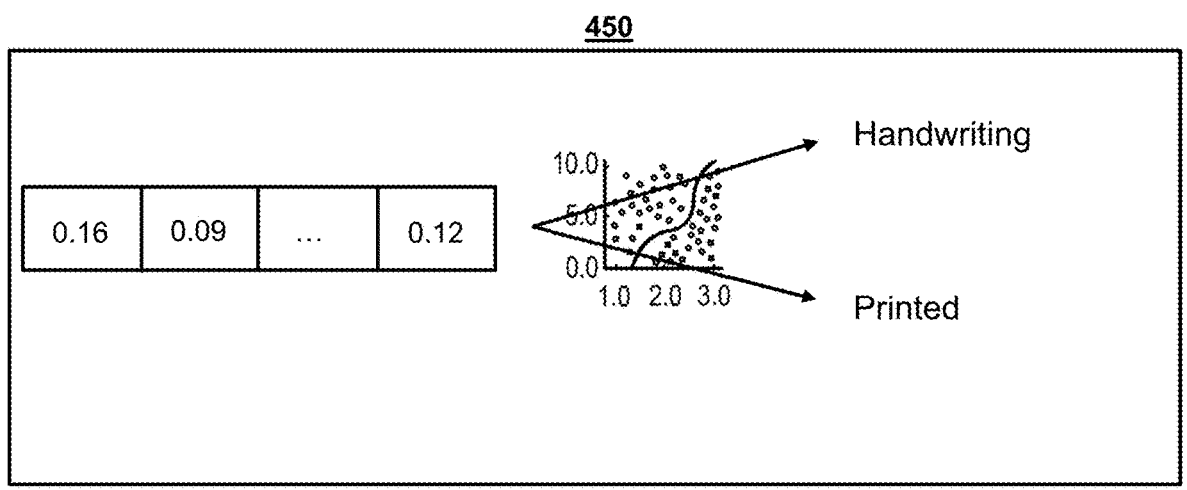

FIG. 4 shows an illustrative diagram for distinguishing between handwritten and printed content, in accordance with one or more embodiments. For example, as shown in diagram 400, the system may receive an image or a portion of an image (e.g., image 402). Image 402 may comprise an image of a textual character. The system may then determine whether or not image 402 is either handwritten or printed content. For example, the system may comprise a supervised image pattern recognition model that detects handwritten content. For example, the system may automatically recognize patterns and regularities in image 402 based on similar patterns in similar sized portions. The system may analyze image 402 to determine the placement and intensities of pixels in image 404. For example, the system may, for each extracted unit, generate a small-size image (e.g., in order to preserve processing power) and determine the pixel intensities in this image to use as mathematical representations. The mathematical representation expresses the shape characteristics of the unit which can be used to distinguish handwriting from printed content. The system may then determine a series of values (e.g., values 406) based on pixel data corresponding to of image 404.

The system may then determine whether or not image 402 corresponds to handwritten or printed content. For example, the system may be trained from labeled training data (e.g., a dataset of scanned images containing handwriting and printed content), but when no labeled data are available other algorithms can be used to discover previously unknown patterns. For example, the system (e.g., as shown in diagram 450) may provide an assignment of a label (e.g., handwritten or printed) based on a series of values (e.g., values 406) based on pixel data corresponding to a portion of image 402.

In some embodiments, the system may use statistical inference to determine the best label for a given instance (e.g., portion of image 402). For example, the system may comprise a classifier algorithm that provides an assignment of a label (e.g., handwritten or printed). Alternatively or additionally, the system may be a probabilistic classifier that provides an output probability of the instance being described by the given label. For example, in some embodiments, the system may use a supervised learning ML model (e.g. Multi-Layer Perceptron) to classify a unit as handwriting or printed.

Figure 5:
FIG. 5 shows an illustrative diagram for scale space merging in accordance with one or more embodiments.
Figure 5:
Figure 5:
Figure 5:
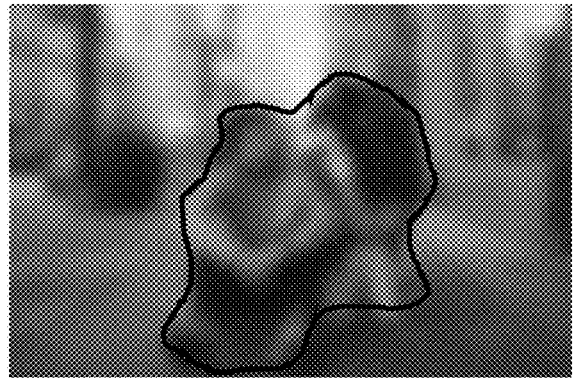

FIG. 5 shows an illustrative diagram for scale space merging in accordance with one or more embodiments. For example, scale space merging relates to handling image structures at different scales, by representing an image as a one-parameter family of smoothed images, the scale-space representation, parametrized by the size of the smoothing kernel used for suppressing fine-scale structures. For example, image set 500 shows an image ("original image") being subjected to various levels of filter to identify an optimal level ("significant filtering"). The system may then identify an object in the image corresponding to the image set at the optimal level. For example, as shown in image set 500, by using various levels of blur, the objects (e.g., a man and dog) appear to be blurred together into a single object. The system may then detect a single object (as opposed to two objects) based on the proximity of the objects to each other. The system may use this process with merge detected handwritten characters into words.

For example, scale space merging (or filtering) subjects an image to different filtering levels (blurring), then selects one based on certain criteria (e.g. fine vs rough details, noise reduction, selection of important components). For example, when images are blurred, objects that are located near each other will merge into one object. With respect to applying scale space merging to handwritten content, the system may determine the number of units to extract. For example, based on the level of filtering, the system may extract different numbers of units.

Figure 6:
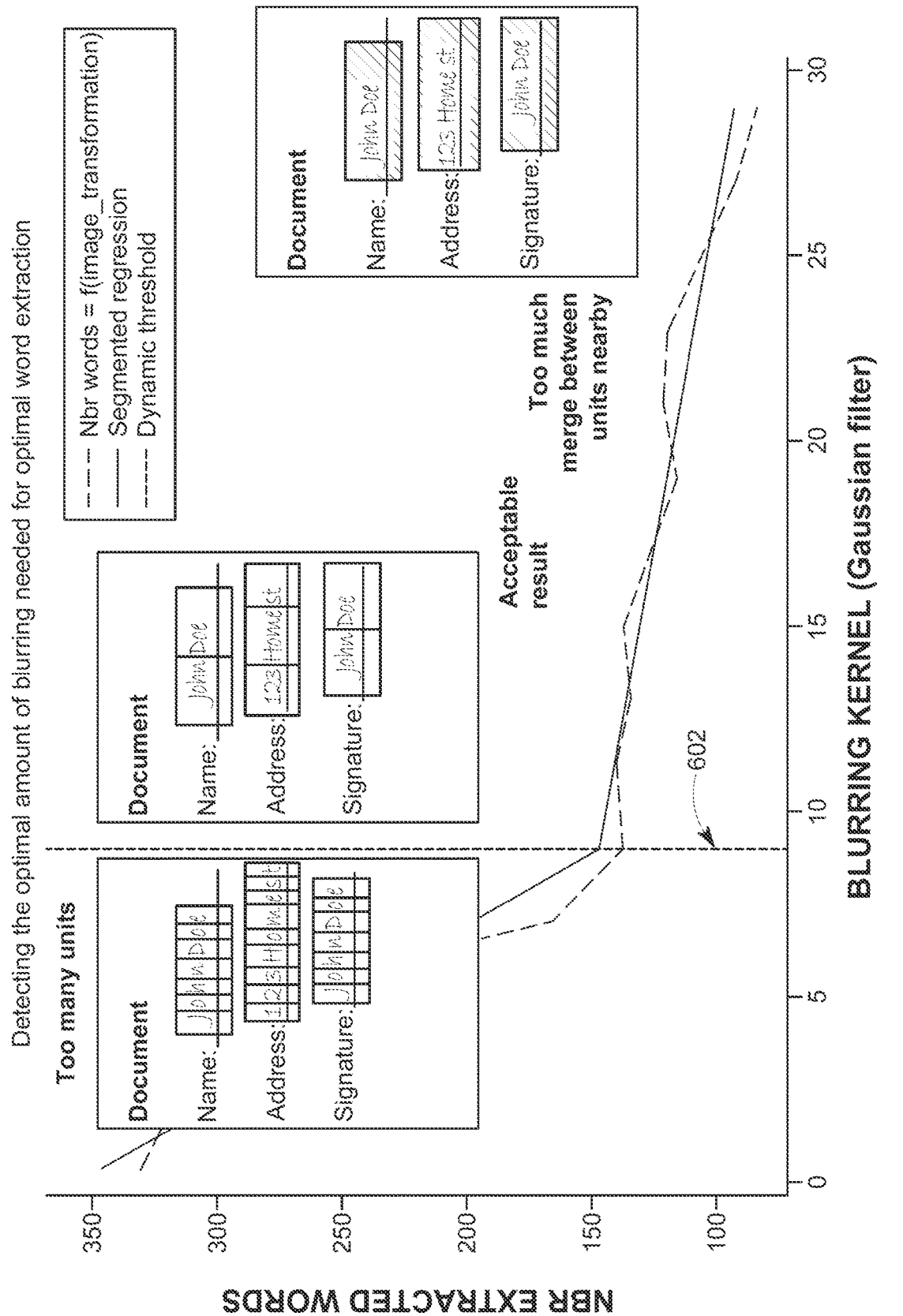
FIG. 6 shows a graph for determining optimal blurring, in accordance with one or more embodiments.

FIG. 6 shows a graph for determining optimal blurring, in accordance with one or more embodiments. For example, the system may determine an optimal level of blurring to ensure that the number of units extracted corresponds to different text strings. For example, unlike printed content, space in an original document cannot be relied on for separating text strings for handwritten content as different handwritten text strings may overlap the borders of each other and/or not conform to a standardized spacing scheme and/or template.

As shown in FIG. 6, the system may balance too many units with too much merge. As shown in FIG. 6, the "too many units" example have boxes around each letter of the handwritten text (John Doe, etc.) to demonstrate that the algorithm is not detecting words at that blurring level. In contrast, the acceptable results adjusts the merge to a word level, and the "too much merge" detects entire phrases.

Figure 7:
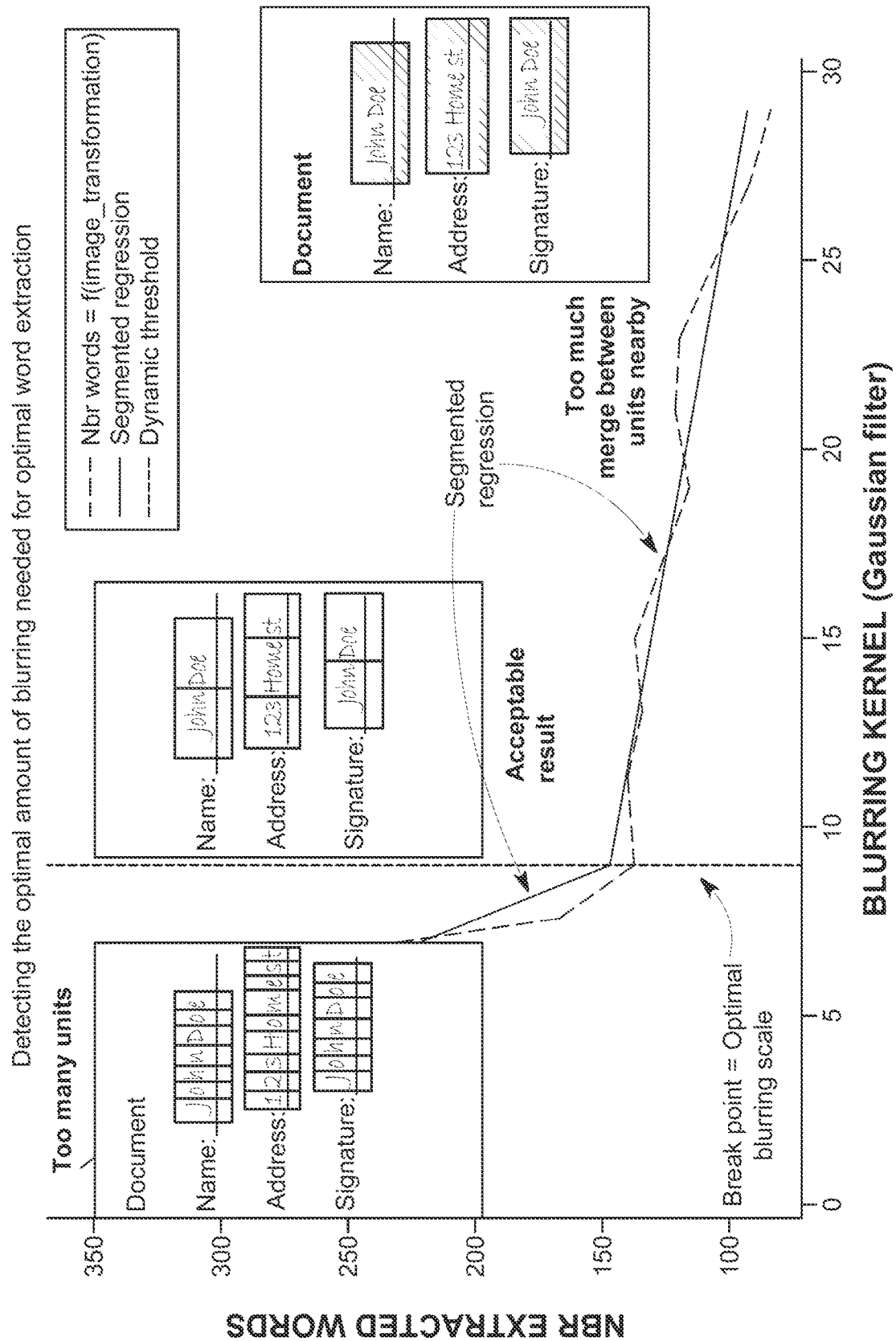
FIG. 7 shows another graph for determining optimal blurring, in accordance with one or more embodiments.

A higher filter (e.g., featuring more blurring) may create more images blurred together and less overall units, while a lower filter (e.g., featuring less blurring) may create less images blurred together and more overall units. The system may thus detect the optimal amount of blurring using scale space filtering. As shown in FIG. 6, an optimal amount of blurring may be determined to correspond to the vertical line 602 as highlighted in FIG. 7.

To determine the optimal amount of blurring, the system may use segmented linear regression. For example, for image blurring, a Gaussian kernel is used, defined as follows:

$$g(x, y, \sigma) = \frac{1}{2\pi\sigma} e^{-(x+y)2/2\sigma^2}$$

where (x,y) are the image pixel coordinates, and σ is the blurring parameter that controls the blurring scale. Upon applying the blurring, the number of extracted words ($N_{words}$) is calculated as a function $f$ of the blurring scale σ:

$$N_{Words} = f(\sigma)$$

The number of extracted words will decrease as a increases. Segmented linear regression may then be used to segment $N_{words}=F(\sigma)$ into two segments. The breakpoint is detected, and the system provides the optimal blurring scale ($\sigma_{opt}$), and it is used to apply optimal blurring $g(x,y,\sigma_{opt})$ on the handwriting image.

Figure 8:
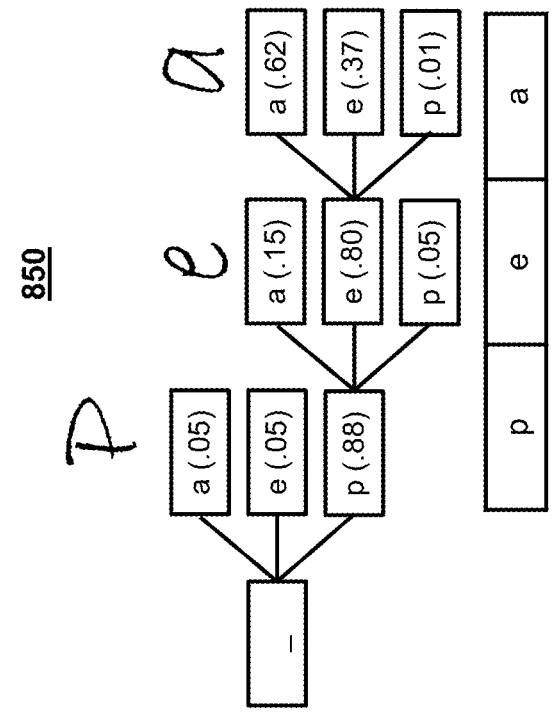
FIG. 8 shows a diagram related to the use of Long Short-Term Memory (LSTM) network for character recognition, in accordance with one or more embodiments.

FIG. 8 shows a diagram related to the use of Long Short-Term Memory (LSTM) network for character recognition, in accordance with one or more embodiments. For example, after the system has detected and extracted the optimal number of handwriting units, the system may use a LSTM network for character recognition. For example, at step 800, the LSTM encodes the character probabilities for a character in an extracted unit.

For example, the LSTM is an artificial recurrent neural network ("RNN") architecture. The use of the LSTM may provide superior results to other types of RNN architecture. For example, when training other RNN using back-propagation, the gradients which are back-propagated can tend to zero or infinity, because of the computations involved in the process, which use finite-precision numbers. RNNs using LSTM units partially solve the vanishing gradient problem, because LSTM units allow gradients to also flow unchanged.

At step 850, the system may use a beam search to optimize the raw probabilities by taking into account the conditional probability of a character based on the preceding characters. For example, beam search is a heuristic search algorithm that explores a graph by expanding the most promising node in a limited set. Beam search is an optimization of best-first search that reduces its memory requirement. The system may determine the word that corresponds to the text string and/or digitally recognize the extracted handwritten content.

Figure 9:
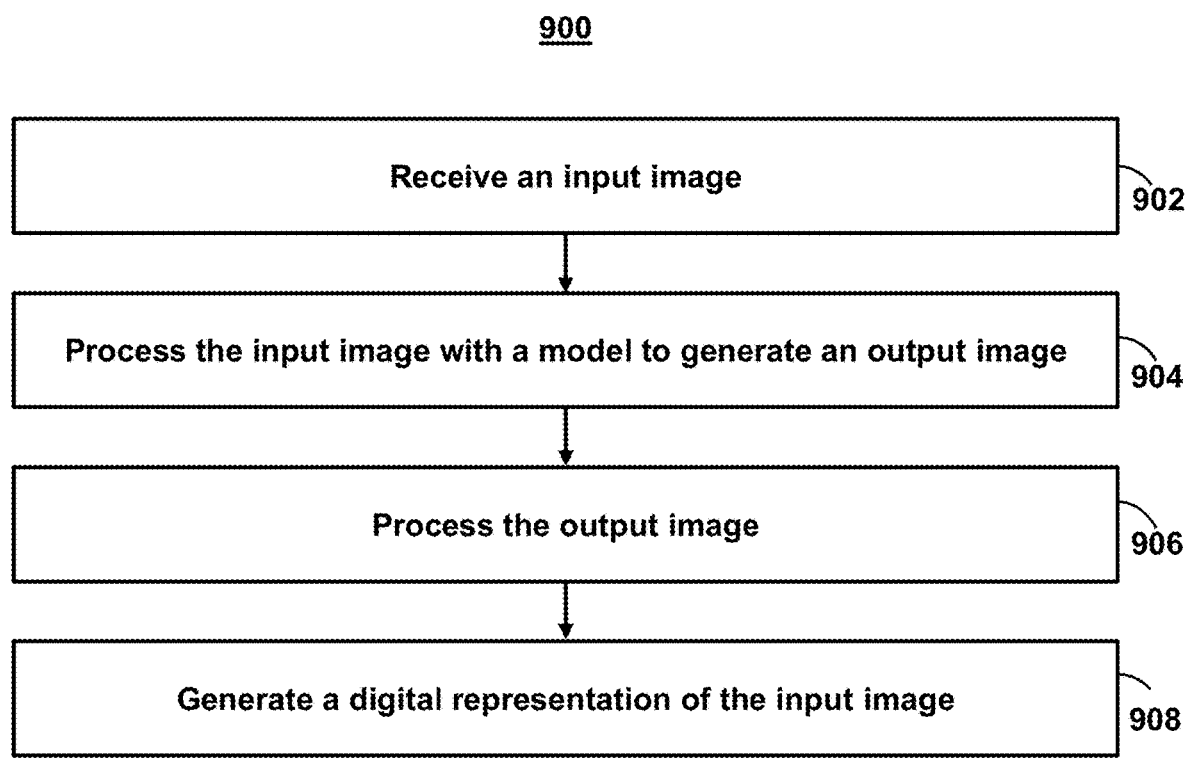
FIG. 9 shows a flowchart of the steps involving adaptive, template-independent handwriting extraction from images using machine learning models and without manual localization or review, in accordance with one or more embodiments.

FIG. 9 shows a flowchart of the steps involved in adaptive, template-independent handwriting extraction from images using machine learning models and without manual localization or review. For example, process 900 may represent the steps taken by one or more devices as shown in FIG. 2 when digitizing handwriting in documents.

At step 902, process 900 receives (e.g., by control circuitry of one or more of the devices in FIG. 2) an input image. For example, the system may receive an input image, wherein the input image comprises native printed content and native handwritten content. For example, the input image may correspond to image 102 (FIG. 1). Native handwritten content and native printed content may correspond to content 114 (FIG. 1) and content 112 (FIG. 1), respectively.

At step 904, process 900 processes (e.g., by control circuitry of one or more of the devices in FIG. 2) the input image with a model to generate an output image. For example, the system may process the input image with a model to generate an output image. During processing, the system may extract handwritten content based on the native handwritten content. In some embodiments, the model may filter out printed content in inputted images (e.g., as a processing step to enhance image quality, reduce noise, etc.). Additionally or alternatively, the system may then extract units of handwritten content in the inputted images. Additionally or alternatively, the system may also adaptively merge the units of handwritten content in the inputted images.

In some embodiments, processing the input image with the model to generate the output image may comprise identifying the native printed content, filtering out the native printed content, identifying the native handwritten content, and extracting the native handwritten content. In some embodiments, filtering out the native printed content may comprise detecting a horizontal pattern or a vertical pattern using a convolutional image filter and in response to detecting a horizontal pattern or a vertical pattern, removing a horizontal line or a vertical line. In some embodiments, identifying the native handwritten content may comprise identifying a contiguous region of foreground pixels that are connected in the input image; designating the contiguous region as a unit; generating a unit image by reducing an image size of a portion of the input image corresponding to the unit; determining pixel intensities in the unit image; and generating a feature input based on the pixel intensities.

In some embodiments, identifying the native handwritten content further may comprises inputting the feature input into a supervised machine learning model (e.g., a multi-layer perceptron), wherein the supervised machine learning model is trained to classify the feature input as a native handwritten content type or a native typewritten content type. The system may also receive a feature output from the supervised machine learning model, wherein the feature output classifies the unit as the native handwritten content type or the native typewritten content type; and in response to the feature output being classified as the native handwritten content type, the determines to extract the native handwritten content.

In some embodiments, processing the input image with the model to generate the output image may comprise identifying units in the native handwritten content and adaptively merging the units using scale space filtering. In some embodiments, adaptively merging the units using scale space filtering may comprise determining a number of extracted words as a function of a blurring scale. The system may then segment, using segmented linear regression, the function into two segments and determine a breakpoint for the two segments. Using the breakpoint, the system may determine an optimal blurring scale and use the optimal blurring scale to apply optimal blurring for adaptively merging the units. In some embodiments, processing the output image to digitally recognize the extracted handwritten content may comprise using a Long Short-Term Memory (LSTM) network to encode character probabilities of the extracted handwritten content and using beam search algorithm on the character probabilities for word-level translation.

At step 906, process 900 (e.g., by control circuitry of one or more of the devices in FIG. 2), the output image. For example, the system may process the output image to digitally recognize the extracted handwritten content. For example, the system may apply optical character recognition or otherwise perform a process the digitally store a representation of the handwritten content in a machine-readable format.

At step 908, process 900 generates (e.g., by control circuitry of one or more of the devices in FIG. 2) a digital representation of the input image. For example, the system may generate a digital representation of the input image, wherein the digital representation comprises the native printed content and the digitally recognized extracted handwritten content. In some embodiments, the digital representation comprises the word-level translation for the extracted handwritten content.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, or in parallel, or simultaneously to reduce lag or increase the speed of the system or method. Furthermore, it should be noted that any of the devices or equipment discussed in relation to FIGS. 1-8 could be used to perform one or more of the steps in FIG. 9. Additionally or alternatively, one or more steps of process 900 could be switched with and/or combined with one or more steps.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving an input image, wherein the input image comprises native printed content and native handwritten content; processing the input image with a model to generate an output image, wherein the output image comprises extracted handwritten content based on the native handwritten content, and wherein the model: filters out printed content in inputted images; extracts units of handwritten content in the inputted images; and adaptively merges the units of handwritten content in the inputted images; processing the output image to digitally recognize the extracted handwritten content; and generating a digital representation of the input image, wherein the digital representation comprises the native printed content and the digitally recognized extracted handwritten content.

2. The method of any of the proceeding embodiments, wherein processing the input image with the model to generate the output image further comprises: identifying the native printed content; filtering out the native printed content; identifying the native handwritten content; and extracting the native handwritten content.

3. The method of any of the proceeding embodiments, wherein filtering out the native printed content comprises: detecting a horizontal pattern or a vertical pattern using a convolutional image filter; and in response to detecting a horizontal pattern or a vertical pattern, removing a horizontal line or a vertical line.

4. The method of any of the proceeding embodiments, wherein identifying the native handwritten content comprises: identifying a contiguous region of foreground pixels that are connected in the input image; designating the contiguous region as a unit; generating a unit image by reducing an image size of a portion of the input image corresponding to the unit; determining pixel intensities in the unit image; and generating a feature input based on the pixel intensities.

5. The method of any of the proceeding embodiments, wherein identifying the native handwritten content further comprises: inputting the feature into a supervised machine learning model, wherein the supervised machine learning model is trained to classify the feature input as a native handwritten content type or a native typewritten content type; receiving a feature output from the supervised machine learning model, wherein the feature output classifies the unit as the native handwritten content type or the native typewritten content type; and in response to the feature output being classified as the native handwritten content type, determining to extract the native handwritten content.

6. The method of any of the proceeding embodiments, wherein the supervised machine learning model comprises a multi-layer perceptron.

7. The method of any of the proceeding embodiments, wherein processing the input image with the model to generate the output image further comprises: identifying units in the native handwritten content; and adaptively merging the units using scale space filtering.

8. The method of any of the proceeding embodiments, wherein adaptively merging the units using scale space filtering comprises: determining a number of extracted words as a function of a blurring scale; segmenting, using segmented linear regression, the function into two segments; determining a breakpoint for the two segments; using the breakpoint to determine an optimal blurring scale; and using the optimal blurring scale to apply optimal blurring for adaptively merging the units.

9. The method of any of the proceeding embodiments, wherein processing the output image to digitally recognize the extracted handwritten content comprises: using a Long Short-Term Memory (LSTM) network to encode character probabilities of the extracted handwritten content; and using beam search algorithm on the character probabilities for word-level translation.

10. The method of any of the proceeding embodiments, wherein the digital representation comprises the word-level translation for the extracted handwritten content.

11. A tangible, non-transitory, machine-readable medium storing instructions that, when executed by a data processing apparatus, cause the data processing apparatus to perform operations comprising those of any of embodiments 1-10.

12. A system comprising: one or more processors and memory storing instructions that, when executed by the processors, cause the processors to effectuate operations comprising those of any of embodiments 1-10.

13. A system comprising means for performing any of embodiments 1-10.

What is claimed is:

1. A system for adaptive, template-independent handwriting extraction from images using machine learning models and without manual localization or review, the system comprising:
cloud-based storage circuitry configured to store:
a model, wherein the model:
filters out printed content in inputted images;
extracts units of handwritten content from the inputted images; and
adaptively merges the units of handwritten content in the inputted images;
a supervised machine learning model comprising a multi-layer perceptron that is integrated into the model, wherein the supervised machine learning model is trained to classify feature inputs as a native handwritten content type or a native typewritten content type;
cloud-based control circuitry configured to:
receive an input image, wherein the input image comprises native printed content and native handwritten content;
process the input image with a model to generate an output image, wherein the output image comprises extracted handwritten content based on the native handwritten content, wherein processing the input image with the model to generate the output image further comprises:
identifying the native printed content;
filtering out the native printed content;
identifying the native handwritten content;
extracting the native handwritten content;
identifying units in the native handwritten content;
adaptively merging the units using scale space filtering; and
process, using a Long Short-Term Memory (LSTM) network, the output image to digitally recognize the extracted handwritten content;
generate a digital representation of the input image, wherein the digital representation comprises the native printed content and the digitally recognized extracted handwritten content;
cloud-based input/output circuitry configured to:
generate for display, on a user interface, the digital representation.

2. A method for adaptive, template-independent handwriting extraction from images using machine learning models and without manual localization or review, the method comprising:
receiving an input image, wherein the input image comprises native printed content and native handwritten content;
processing the input image with a model to generate an output image, wherein the output image comprises extracted handwritten content based on the native handwritten content, and wherein the model:
filters out printed content in inputted images;
extracts units of handwritten content in the inputted images; and
adaptively merges the units of handwritten content in the inputted images;
processing the output image to digitally recognize the extracted handwritten content; and
generating a digital representation of the input image, wherein the digital representation comprises the native printed content and the digitally recognized extracted handwritten content.

3. The method of claim 2, wherein processing the input image with the model to generate the output image further comprises:
identifying the native printed content;
filtering out the native printed content;
identifying the native handwritten content; and
extracting the native handwritten content.

4. The method of claim 3, wherein filtering out the native printed content comprises:
detecting a horizontal pattern or a vertical pattern using a convolutional image filter; and
in response to detecting a horizontal pattern or a vertical pattern, removing a horizontal line or a vertical line.

5. The method of claim 3, wherein identifying the native handwritten content comprises:
identifying a contiguous region of foreground pixels that are connected in the input image;
designating the contiguous region as a unit;
generating a unit image by reducing an image size of a portion of the input image corresponding to the unit;
determining pixel intensities in the unit image; and
generating a feature input based on the pixel intensities.

6. The method of claim 5, wherein identifying the native handwritten content further comprises:
inputting the feature input into a supervised machine learning model, wherein the supervised machine learning model is trained to classify the feature input as a native handwritten content type or a native typewritten content type;
receiving a feature output from the supervised machine learning model, wherein the feature output classifies the unit as the native handwritten content type or the native typewritten content type; and
in response to the feature output being classified as the native handwritten content type, determining to extract the native handwritten content.

7. The method of claim 6, wherein the supervised machine learning model comprises a multi-layer perceptron.

8. The method of claim 3, wherein processing the input image with the model to generate the output image further comprises:
identifying units in the native handwritten content; and
adaptively merging the units using scale space filtering.

9. The method of claim 3, wherein adaptively merging the units using scale space filtering comprises:
determining a number of extracted words as a function of a blurring scale;
segmenting, using segmented linear regression, the function into two segments;
determining a breakpoint for the two segments;
using the breakpoint to determine an optimal blurring scale; and
using the optimal blurring scale to apply optimal blurring for adaptively merging the units.

10. The method of claim 2, wherein processing the output image to digitally recognize the extracted handwritten content comprises:
using a Long Short-Term Memory (LSTM) network to encode character probabilities of the extracted handwritten content; and
using beam search algorithm on the character probabilities for word-level translation.

11. The method of claim 10, wherein the digital representation comprises the word-level translation for the extracted handwritten content.

12. A non-transitory, computer-readable medium for adaptive, template-independent handwriting extraction from images using machine learning models and without manual localization or review, comprising instructions that, when executed by one or more processors, cause operations comprising:
- receiving an input image, wherein the input image comprises native printed content and native handwritten content;
- processing the input image with a model to generate an output image, wherein the output image comprises extracted handwritten content based on the native handwritten content, and wherein the model:
  - filters out printed content in inputted images;
  - extracts units of handwritten content in the inputted images; and
  - adaptively merges the units of handwritten content in the inputted images;
- processing the output image to digitally recognize the extracted handwritten content;
- generating a digital representation of the input image, wherein the digital representation comprises the native printed content and the digitally recognized extracted handwritten content.

13. The non-transitory, computer-readable medium of claim 12, wherein processing the input image with the model to generate the output image further comprises:
- identifying the native printed content;
- filtering out the native printed content;
- identifying the native handwritten content; and
- extracting the native handwritten content.

14. The non-transitory, computer-readable medium of claim 13, wherein filtering out the native printed content comprises:
- detecting a horizontal pattern or a vertical pattern using a convolutional image filter; and
- in response to detecting a horizontal pattern or a vertical pattern, removing a horizontal line or a vertical line.

15. The non-transitory, computer-readable medium of claim 13, wherein identifying the native handwritten content comprises:
- identifying a contiguous region of foreground pixels that are connected in the input image;
- designating the contiguous region as a unit;
- generating a unit image by reducing an image size of a portion of the input image corresponding to the unit;
- determining pixel intensities in the unit image; and
- generating a feature input based on the pixel intensities.

16. The non-transitory, computer-readable medium of claim 15, wherein identifying the native handwritten content further comprises:
- inputting the feature input into a supervised machine learning model, wherein the supervised machine learning model is trained to classify the feature input as a native handwritten content type or a native typewritten content type;
- receiving a feature output from the supervised machine learning model, wherein the feature output classifies the unit as the native handwritten content type or the native typewritten content type; and
- in response to the feature output being classified as the native handwritten content type, determining to extract the native handwritten content.

17. The non-transitory, computer-readable medium of claim 16, wherein the supervised machine learning model comprises a multi-layer perceptron.

18. The non-transitory, computer-readable medium of claim 13, wherein processing the input image with the model to generate the output image further comprises:
- identifying units in the native handwritten content; and
- adaptively merging the units using scale space filtering.

19. The non-transitory, computer-readable medium of claim 13, wherein adaptively merging the units using scale space filtering comprises:
- determining a number of extracted words as a function of a blurring scale;
- segmenting, using segmented linear regression, the function into two segments; and
- determining a breakpoint for the two segments;
- using the breakpoint to determine an optimal blurring scale; and
- using the optimal blurring scale to apply optimal blurring for adaptively merging the units.

20. The non-transitory, computer-readable medium of claim 12, wherein processing the output image to digitally recognize the extracted handwritten content comprises:
- using a Long Short-Term Memory (LSTM) network to encode character probabilities of the extracted handwritten content; and
- using beam search algorithm on the character probabilities for word-level translation.

* * * * *